United States Patent [19]

Goldstein et al.

[11] 4,170,447

[45] Oct. 9, 1979

[54] METHOD OF SEPARATING SOLID PARTICULATE

[75] Inventors: H. Lawrence Goldstein, East Brunswick; Henry Shaw, Scotch Plains, both of N.J.

[73] Assignee: Exxon Research & Engineering Co., Florham Park, N.J.

[21] Appl. No.: 758,443

[22] Filed: Jan. 11, 1977

[51] Int. Cl.[2] .......................... B03C 3/00; B01D 53/34

[52] U.S. Cl. .......................................... 423/215.5; 55/3; 55/100; 431/2; 110/342; 110/345

[58] Field of Search ................... 423/215.5; 55/3, 100; 110/1 P, 1 J, 342, 345, 346; 431/2; 432/72; 252/61.51, 62.55; 209/8, 214, 215; 148/105, 108

[56] References Cited

U.S. PATENT DOCUMENTS

| | | | |
|---|---|---|---|
| 896,876 | 8/1908 | Williams | 44/4 |
| 1,012,488 | 12/1911 | Wedge | 55/100 |
| 1,957,209 | 5/1934 | Hedley et al. | 55/100 |
| 2,911,292 | 11/1959 | Baldeschweiler | 44/68 |
| 3,067,131 | 12/1962 | Bergstrom | 55/3 X |
| 3,078,665 | 2/1963 | Rocchini et al. | 60/39.02 |
| 3,126,401 | 3/1964 | Ecke | 260/439 |
| 3,213,026 | 10/1965 | Jordon et al. | 423/450 X |
| 3,294,685 | 12/1966 | Stevens et al. | 252/49.7 |
| 3,322,793 | 5/1967 | Bozak | 260/340.6 |
| 3,327,455 | 6/1967 | Wertheimer | 55/100 |
| 3,332,755 | 7/1967 | Kukin | 44/6 |
| 3,348,932 | 10/1967 | Kukin | 44/4 |
| 3,448,052 | 6/1969 | Otto | 252/62.51 R |
| 3,712,029 | 1/1973 | Charlton | 55/100 |
| 3,729,900 | 5/1973 | Dennig | 55/100 |
| 3,762,135 | 10/1973 | Ikebe et al. | 55/100 |
| 3,767,545 | 10/1973 | Lucero | 204/155 |
| 3,929,433 | 12/1975 | Lucero | 55/3 |
| 4,042,487 | 8/1977 | Seguchi et al. | 204/48 R |

FOREIGN PATENT DOCUMENTS

| | | |
|---|---|---|
| 2172797 | 10/1973 | France . |
| 2181607 | 6/1976 | France . |
| 47-9401 | 3/1972 | Japan . |
| 48-20767 | 3/1973 | Japan . |
| 761378 | 11/1956 | United Kingdom . |
| 781581 | 8/1957 | United Kingdom . |

OTHER PUBLICATIONS

Watson, "Magnetic Filtration", Journal of Applied Physics, vol. 44, No. 9, pp. 4209–4213, Sep. 1973.

*Primary Examiner*—Earl C. Thomas

*Attorney, Agent, or Firm*—Wayne Hoover; Eugene Zagarella, Jr.

[57] ABSTRACT

An improved process and apparatus for separating solid particulate from a gas stream having the same entrained therein. The separation is accomplished with a magnetic separator comprising a plurality of electro magnets disposed generally around or within the periphery of the gas stream or extending through a cross-section thereof, which magnets are operated such that continuous separation is possible. When the solid particulate is not, normally, subject to magnetic attraction, the same may be rendered subject to such attraction by incorporating a suitable compound therein. This is most conveniently accomplished by adding a precursor of such a compound to the process in which the solid particulate is formed at a point after which the subsequent process steps would result in the conversion of the precursor to a suitable material. The particulate is, of course, separated from the gas stream by magnetic attraction and is then withdrawn from the solid separator by "turning off" the electro magnet or magnets.

16 Claims, 10 Drawing Figures

FIG. 1.
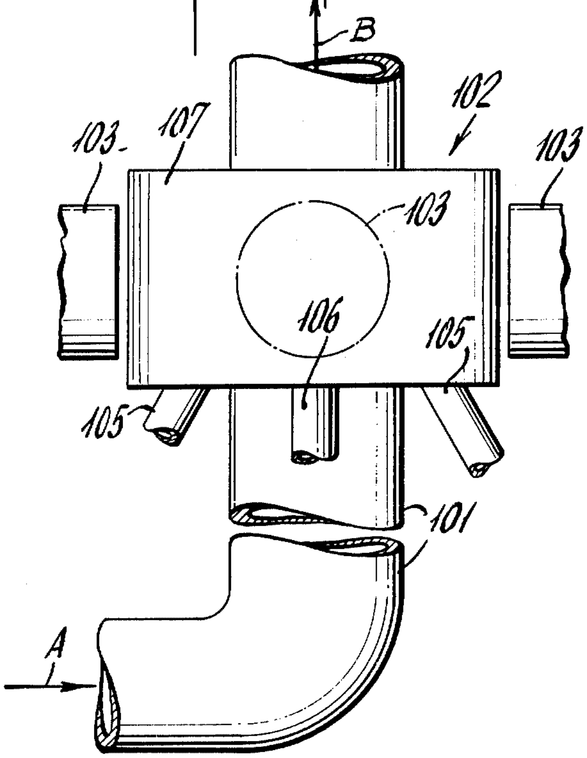
FIG. 2.
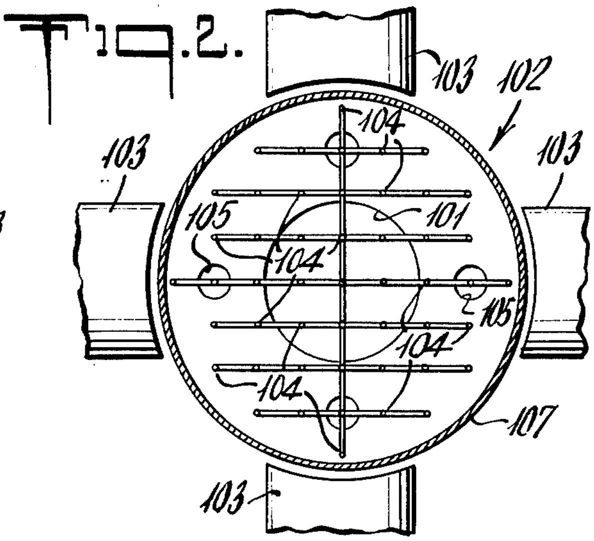
FIG. 3.
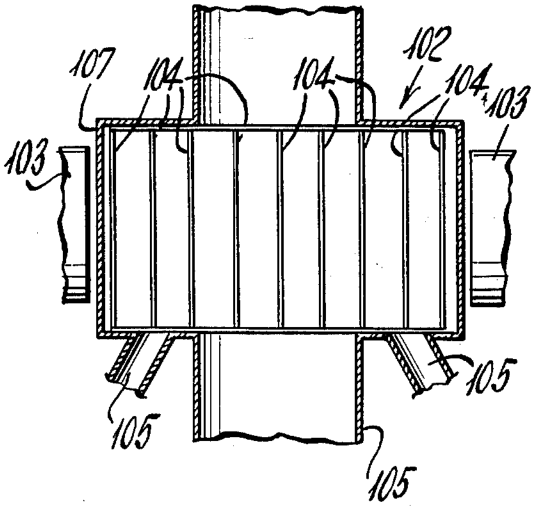
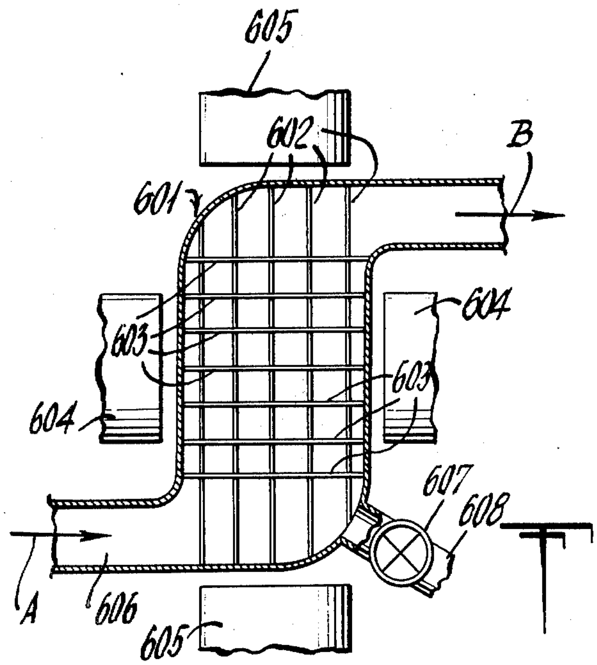
FIG. 6.

FIG. 4.
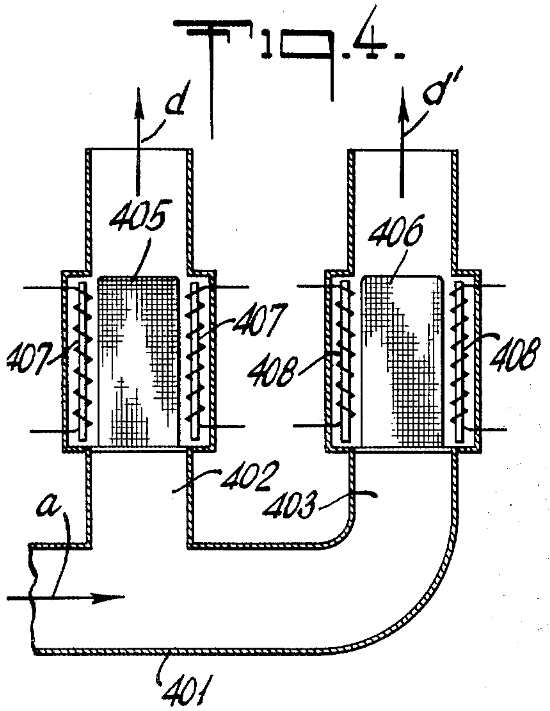
FIG. 7.
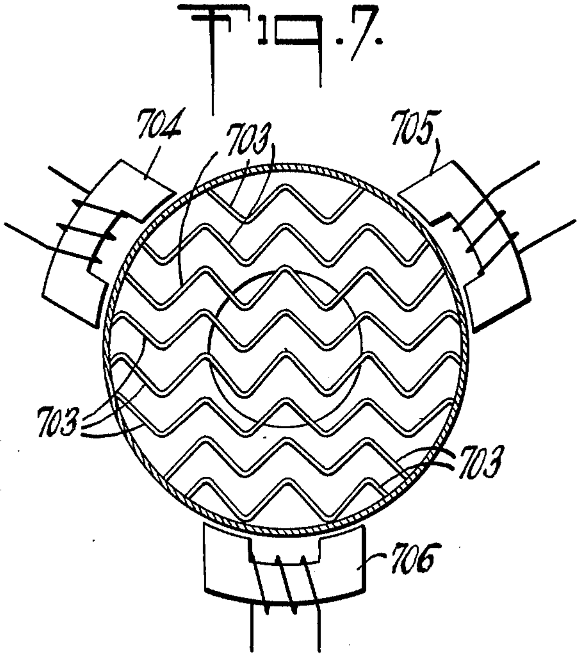
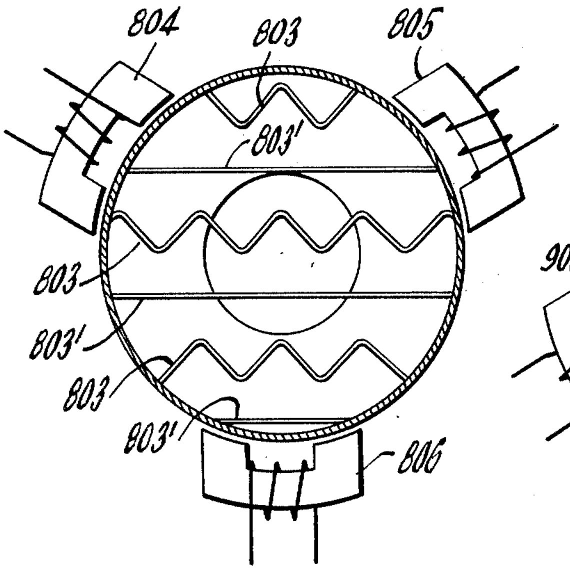
FIG. 8.
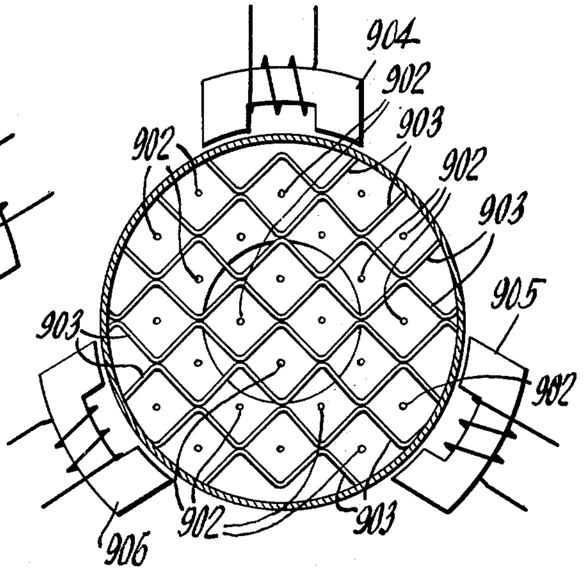
FIG. 9.

METHOD OF SEPARATING SOLID PARTICULATE

BACKGROUND OF THE INVENTION

This invention relates to an improved method for separating the solid particulate entrained in a gas stream and to an apparatus for effecting such separation. More particularly, the present invention relates to a method for separating solid particulate from a gas stream wherein a magnetic separator is employed and to the magnetic separator.

It is, of course, well known that the emission of solid particulate matter to the atmosphere is a hazard to both animal and plant life in the surrounding community. In this regard, it should be noted that the emission of solid particulate matter to the atmosphere commonly results from the combustion of carbonaceous fuels such as coal and oil during the production of electricity and in various chemical operations. Such emissions are also encountered during the crushing of stone and in various sand and gravel operations. Such emissions are also encountered in various agricultural operations such as grain elevators, feed mills, cotton gins and the like. The emission of the solid particulate to the atmosphere is also encountered during various mining and metal working processes such as in the mining of iron ore and the production of steel, the mining and production of copper and in the manufacture of aluminum. Such emissions are also encountered during the manufacture of various fertilizers, and the mining and processing of phosphate rock, during the manufacture and use of asphalt, in the cleaning of coal and in the production of carbon black. The actual effect on both the animal and plant life of a particular particulate will, of course, depend upon several factors such as the chemical and physical properties of the particulate and the particular animal or plant life effected thereby.

Heretofore, several methods and associated apparatus have been proposed for the purpose of separating particulate from various gas streams, thereby preventing their emission to the atmosphere. The more important methods are filtration, impingement, sedimentation, electrostatic precipitation, thermal precipitation and centrifugation. Magnetic separators have, however, been proposed and, indeed, may have found limited use for the purpose of separating solid particulate from a gas stream.

In general, each of these methods has been used with some degree of success. Each of the processes proposed heretofore, however, suffer from some disadvantage, and none of the processes proposed heretofore are particularly effective for separating submicron particulate matter, which particulate matter is now known to pose the greatest threat to the health and welfare of the surrounding community, especially with reasonable pressure drops or other operating conditions. For example, filtration can be used to effect the separation of relatively small particle size particulate. The pressure drop required to pass the media through the filter, however, increases rapidly as the pore size of the filter decreases. Moreover, even when reasonable pressure drops can be used at the beginning, the pressure drop required increases significantly as the amount of particulate separated increases. Impingement devices, on the other hand, are generally not effective for separating solid particulate having a particle size below about 2 microns unless the gas stream conveying the particles is travelling at a very high velocity. Similarly, sedimentation methods are not generally suitable for the separation of particles below about 5 microns in diameter. Electrostatic precipitation, on the other hand, is effective for the separation of particles as small as 0.01 microns but potential differences between about 12,000 and 30,000 volts are required to effect separation in this manner. Thermal precipitation will, of course, separate particles as small as 0.001 microns but here, temperature gradients as high as 3,000° C./cm are often required. Cyclones, on the other hand, are not generally effective for the separation of particles smaller than about 5 microns.

As indicated previously, magnetic separators have been proposed heretofore. To date, however, these separators have not been widely used due partly to poor efficiencies in the submicron range and partly because other separating means must be used in combination therewith. In this regard, it should be noted that magnetic filters have been proposed heretofore but these devices suffer from substantially the same disadvantages as those indicated previously with respect to filtration generally. Also, the use of permanent magnets to attract or separate magnetic particulate has been proposed heretofore. Use in combination with other means to separate non-magnetic particulate, however, is generally required. Moreover, since permanent magnets have been proposed such devices are limited with respect to flexibility and significant equipment changes could be required if materials of significantly different magnetic moment were to be separated.

In light of the foregoing, then, it is believed that the need for an improved solid particulate separator which could be used to effect the separation of submicron particulate without requiring excessive pressure drops or extremely high gas velocities is readily apparent. Similarly, it is believed that the need for a magnetic separator capable of separating submicrons particulate and offering increased flexibility with respect to its ability to separate particulate having different magnetic moments is readily apparent.

SUMMARY OF THE INVENTION

It has now been discovered that the foregoing and other disadvantages of the prior art solid particulate separation methods and apparatus can be avoided by the method and with the apparatus of the present invention and an improved method for separating solid particulate from a gas stream and an improved magnetic separator provided thereby. It is, therefore, an object of the present invention to provide an improved method for separating solid particulate from a gas stream. It is another object of the present invention to provide an improved method for separating solid particulate from a gas stream which does not require high pressure drops to effect the separation. It is still another object of the present invention to provide an improved method for separating solid particulate from a gas stream which does not require high gas velocities to effect the separation of submicron particulate. It is yet another object of the present invention to provide an improved process for separating solid particulate from a gas stream which does not require a high electrical potential to effect the separation. It is an object of a second embodiment of the present invention to provide an improved magnetic separator. It is another object of this second embodiment of the present invention to provide an improved magnetic separator which can be used continuously to effect the separation of solid particulate from a gas stream. It is still another object of a second embodiment of the present invention to provide an improved magnetic separator which can be used to effect separation of solid particulate having different magnetic moments. It is an object of a third embodiment of the present invention to provide a method for making non-magnetic particulate subject to magnetic attraction so that the same may be separated with a magnetic separator. It is another object of a third embodiment of this invention to provide a process for separating non-magnetic particulate which have been made subject to magnetic attraction by the method of the third embodiment of this invention.

In accordance with the present invention, the foregoing and other objects and advantages are accomplished, in a first embodiment, by passing a gas stream containing entrained solid particulate and subject to magnetic attraction through a magnetic field which is sized and which has sufficient strength to permit the separation of submicron particulate. As indicated more fully, hereinafter, the magnetic separation may be used in combination with other separating means. As is also indicated more fully hereinafter, the method of this embodiment of the invention may be operated continuously when a plurality of electromagnets is used to establish the magnetic field and when one or more of these electro magnets is operated intermittently. The objects and advantages of the second embodiment of this invention are accomplished with a magnetic separator comprising a plurality of electro magnets. The objects and advantages of the third embodiment are accomplished by adding a material which will impart a magnetic moment to a nonmagnetic particulate or increase the magnetic moment of a weakly magnetic material at some point in a process operation and thereafter passing the particulate from said operation through a magnetic field. Again, and as indicated more fully hereinafter, the method of this embodiment may be used in combination with other conventional separating means.

BRIEF DESCRIPTION OF THE DRAWINGS

FIG. 1 is an elevation, with portions cut-away and with certain detail omitted for purposes of clarity, of a portion of an exhaust stack comprising a magnetic separator;

FIG. 2 is a horizontal cross-section of the magnetic separator shown in FIG. 1;

FIG. 3 is a vertical cross-section of the magnetic separator shown in FIG. 1;

FIG. 4 is a cross-sectional view illustrating the use of a magnetic separator in combination with a more conventional filtering means;

FIG. 6 is an elevation, with portions cut-away and with certain detail omitted for purposes of clarity, of a portion of an exhaust stack comprising a magnetic separator;

FIG. 7 is a cross-section of a magnetic separator showing an arrangement of elements which could be used in a separator such as those illustrated in FIGS. 1 and 6;

FIG. 8 is a cross-section of a magnetic separator showing another arrangement of elements which could be used in a separator such as those illustrated in FIGS. 1 and 4;

FIG. 9 is a cross-section of a magnetic separator showing still another arrangement of elements which could be used in a separator such as those illustrated in FIGS. 1 and 7.

DETAILED DESCRIPTION OF THE INVENTION

Figure 5:
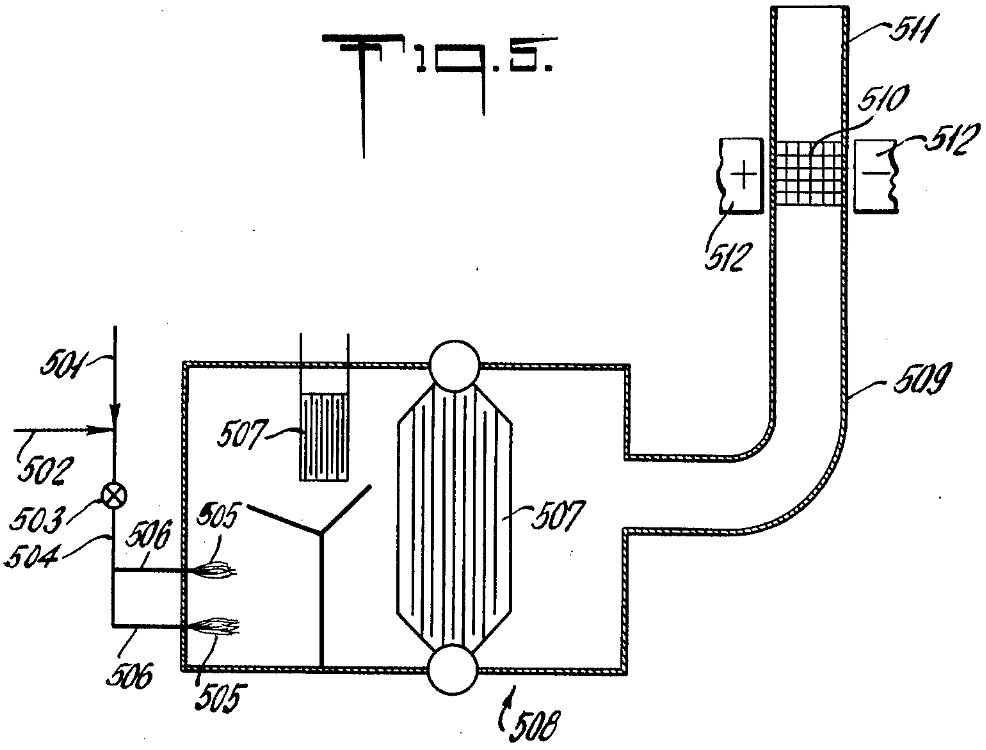
FIG. 5 is a cross-sectional view of a boiler having a magnetic separator installed in the flue gas stream.

As indicated previously, the present invention relates to a method for separating solid particulate from a gas stream wherein magnetic separating means are employed, to the magnetic separating means actually employed and to a method for either increasing the magnetic moment of a solid particulate or rendering such a particulate magnetic. The method of the present invention is, then, readily applicable to the separation of any particulate which can be separated by magnetic means and this includes particulate which is, by its nature, subject to magnetic attraction or which can be combined with such a particulate so as to yield a particulate which will be subject to magnetic attraction.

In general, then, the method of the present invention may be used to separate particulate pıoduced during various mining and metal working operations such as in the mining of iron ore, nickel, cobalt and the like and in the subsequent processing of these ores to produce various metals and/or metal compounds. The process of this invention is also readily applicable to the separation of particulate produced from various machine operations. The method of this invention is, then, applicable to the separation of particulate having a magnetic moment of at least about $1\times10^{-5}$ emu/cm$^3$ without the use of additional steps which would increase the magnetic moment. The method of this invention is, however, most effective for the separation particulate having a magnetic moment of at least about $5\times10^{-4}$ emu/cm$^3$, and is preferably used to separate particulate having a magnetic moment of at least $1\times10^{-2}$ emu/cm$^3$ when no such additional steps are used.

The method of this invention can also be used to separate particulate which can be made to respond to magnetic attraction. In this embodiment, the particulate is, generally, rendered magnetic by adding a material which is, itself, subject to magnetic attraction or a precursor of such a compound at some point in a process prior to the time at which the solid particulate is produced. This is, of course, easily accomplished in processes where the particulate is formed as the result of a high temperature operation such as combustion, pyrolysis, or the like. The method of this embodiment is, however, also applicable to the separation of particulate resulting from a chemical reaction, especially those carried out in a liquid medium such as a solvent or diluent, in which case the metallic material or a precursor thereof is added to the liquid medium. The magnetic material would, then, combine with the particulate when the product is separated from the liquid medium. Similarly, the method of this embodiment could be used to either improve the magnetic moment of a solid particulate or to render the same subject to magnetic attraction any time the material resulting in the particulate is carried in a liquid medium so that the magnetic material, or a precursor thereof, can be dissolved in the liquid such that the same will combine with the solid particulate when the liquid material is separated therefrom. The method of this embodiment can also be used to separate particulate from generally solids operation when and if a magnetic material can be combined with the solid such that the total particulate exhibits a magnetic moment above about $1\times10^{-5}$ emu/cm$^3$, preferably a magnetic moment above about $5\times10^{-4}$ emu/cm$^3$, and most preferably a magnetic moment above about $1\times10^{-2}$ emu/cm$^3$.

In general, the methods of the present invention will be effective to separate solid particulate ranging in size from about 100 microns to about 0.01 microns and carried in a gas stream within the separator having a velocity within the range from about 0.5 to about 5 meters per second. In this regard, it should be noted that the strength of the magnetic field required will depend upon the magnetic moment of the particulate sought to be separated and particularly the magnetic moment of the smallest particle sought to be separated. The length or size of the magnetic field, on the other hand, will depend upon the gas velocity and the maximum distance over which the particulate must travel before the same contacts a magnet. For this reason, then, and as indicated, supra, the method of the present invention is most effective when the solid particulate has a magnetic moment of at least about $1\times10^{-5}$ emu/cm$^3$ and preferably of at least about $5\times10^{-4}$ emu/cm$^3$ and when only a single stage separator is employed the same will be most effective when the gas velocity is below about 2 meters per second.

In general, any method could be used to produce the magnetic field required to effect separation. Continuous operation, on the other hand, is most effectively achieved when the magnetic field is produced with a plurality of electromagnets which are operated intermittently such that one or more of said magnets is operating and attracting particulate while one or more are inoperative so as to facilitate actual separation of the particulate and removal from the gas stream.

In general, each of the magnets will be constructed and operated such that a magnetic field having a strength within the range from about 100 to about 10,000 gauss is created at the source and the same will be positioned such that the minimum magnetic field at any point within the gas stream is, generally within this same range. In general, some degree of separation will be accomplished when a field of the strength specified is maintained over any portion of the gas stream flow path. Best result will, however, be achieved when the field is maintained for a total distance of at least five feet along the flow path and maximum separation efficiency will, generally, be achieved when the magnets are sized and positioned such that a magnetic field of this strength will be maintained along the flow path of the gas stream for a distance within the range from about 10 to about 30 feet. In this regard, it will be appreciated that when greater distances are required for greater efficiency a plurality of magnetic stages could be provided. Moreover, even within the distance specified a plurality of stages could be used, especially where higher magnetic field strengths render the use of a single magnet either impractical or impossible.

In general, the temperature at which the separation is effected is not material to the present invention. Electromagnets are, however, adversely affected by temperatures. For this reason, then the separation will, generally, be accomplished at a temperature below about 1150° C. or, at least, the electromagnet will be suitably insulated to permit use at higher temperatures. Similarly, the pressure at which the separation is accomplished is not material to the present invention.

In most cases where the solid particulate will not be attracted by a magnetic field or where the magnetic moment of the solid particulate is too low to permit practical separation with the method of this invention, it will be necessary to either render the particulate magnetic or to increase the magnetic moment thereof. As already indicated, this can be accomplished by adding a material which is, itself, magnetic or which is a precursor of such a material in such a manner that the same will combine with the non-magnetic particulate so as to yield a total particulate which will be subject to magnetic attraction and therefore subject to separation by the method of the present invention. In processes where the solid particulate is produced as the result of combustion and particularly where the particulate comprises one or more metal oxides such as vanadium oxide, $V_2O_5$, nickel oxide, NiO, or cobalt oxide, $Co_2O_3$, this can be accomplished by adding a salt or similar compound of a metal (which will be subject to magnetic attraction as the corresponding metal oxide) to the material or materials which are being burned. For example, where the solid particulate results from the combustion of fuel oil, the solid particulate can be rendered magnetic by adding an organic or inorganic metal compound to the oil prior to the combustion. In this regard, while solubility of the metal compound in the oil is not critical, the use of an oil soluble metal compound is advantageous. Where the combustion is effected with a solid fuel, on the other hand, the solid particulate can again be rendered magnetic by adding the same materials to the solid fuel prior to combustion. In this regard, it should be noted, that maximum effectiveness will be achieved when the solid fuel is, itself, finely divided prior to combustion so as to facilitate mixing of the magnetic material or the precursor thereof. Such mixing is not, however, essential to the present invention although significantly better results are achieved, and, indeed, magnetic separation could be effectively used even after mixing of a suitable salt with coal, carbon or other solid fuel on a bulk basis.

It will, of course, be appreciated that when a suitable metal compound is added to a fuel prior to combustion the metal compound will, generally, be converted to the corresponding oxide during combustion although other metal forms would be operative. As a result, it is essential to this embodiment of the present invention that the metal portion of the metal compound be in a valence state that will be subject to magnetic attraction when the same is converted to the corresponding oxide. Also, it is important to the present invention, that the corresponding oxide have a magnetic moment greater than about $5\times10^{-4}$ emu/cm$^3$ and preferably greater than about $1\times10^{-2}$ emu/cm$^3$ so that the magnetic moment of the resulting total particulate will still exceed the limits heretofore mentioned.

When the method of this embodiment of the present invention is used to separate particulate produced in a relatively low temperature operation, the same technique will be employed to render the total particulate subject to magnetic separation or to increase the magnetic moment thereof. Often, however, different precursors will be required since different chemical reactions will be involved and, in some cases at least, it will be necessary to add a magnetic material directly to the reaction media or other source of solid particulate where subsequent processing or handling conditions will not result in the conversion of a precursor to a magnetic form. In this regard, it should be noted that such addition could be effected by adding a relatively finely divided magnetic material, in solid form, at some point during the process or handling operation so long as the same is accomplished prior to the separation step.

In general, any compound known to be subject to magnetic separation or attraction and having a magnetic moment within the range or ranges heretofore specified could be used to render an otherwise non-magnetic particulate subject to magnetic attraction or to increase the magnetic moment thereof. Such materials include metals such as iron, cobalt and nickel; metal oxides such as ferric oxide, nickel oxide, cobaltic oxide, and ferrites having the chemical structure $M'M''_2O_4$ where M' is a divalent metal ion and M'' is a trivalent metal ion, such as $Fe^{+3}$. Similarly, when a precursor of one of these materials is to be used essentially any compound which will be converted to one or more of the aforementioned materials during subsequent operation could be used. For example, in combustion and other high temperature operations where oxygen is present any salt having the appropriate valence state and which would be converted to the oxide or to a ferrite could be added to the fuel or other material being processed at the high temperature. In this regard, and with respect to combustion operations it is believed that the corresponding oxide will combine with other metal oxides, which were present as impurities in the fuel, to form spinel (or ferrite) structures which are themselves subject to magnetic attraction. Also, in combustion operations it has been found that the entire solid particulate produced will be subject to magnetic attraction even though the magnetic component actually added or produced as well as any spinel-like structure formed represents only a relatively small portion of the total solid particulate.

In those processes where the solid particulate which would otherwise be emitted to the atmosphere is formed as the result of a precipitation, it is believed that the magnetic component will add to the solid particulate either as a coprecipitant or, when the magnetic component is present as a solid as a seed for the precipitation. In either case, the resulting solid particulate should exhibit a magnetic moment and the same should be subject to magnetic separation in accordance with the method of this invention. In those cases where co-precipitation or the use of a magnetic component as a seed for precipitation is not possible, it is essential that the magnetic component actually bond with at least a portion of the solid particulate, either chemically such as through the formation of a complex or physically before the total solid particulate will be subject to magnetic attraction. Cases wherein such bonding is possible will, of course, be readily apparent to those of ordinary skill in the art and an exhaustive list need not be included herein. In fact, it should be sufficient here to note only that chemical bonding could be effected where the solid particulate is fly ash and the material added to facilitate magnetic separation is iron carbonyl, iron naphthenate, nickel acetylacetonate, cobalt naphthenate and the like. Similarly, physical bonding could be accomplished where the solid particulate is fly ash and the material added to facilitate magnetic separation is $Fe_3O_4$, $NiFe_2O_4$, iron carbonyl and the like. In any case, it will be appreciated that the process of the present invention would not normally, be used where the presence of the material added to facilitate magnetic attraction or a precursor thereof would be undesirable in the products sought to be recovered since, while a portion of this material would be entrained with the solid particulate which would otherwise be emitted to the atmosphere the remainder would be entrained in the products sought to be recovered.

In either of these embodiments, that is, where solid particulate which is itself subject to magnetic attraction or which has been rendered subject to magnetic attraction, the gas stream within the same is entrained will then be passed through a magnetic separator. As previously indicated, the separator will comprise a plurality of electromagnets and any number of such separators could be employed either in parallel or series. Generally, the gas, with entrained particulates, will pass through the separator or series of separators at a gas velocity within the range from about 0.5 to about 5.0 m/sec. and the particulate will be subjected to a magnetic field having a minimum strength within the range from about 100 to about 10,000 gauss. During operation of the separator, the particulate will be attracted toward the magnetic field, withdrawn from the main gas stream and ultimately removed therefrom when the flow of current through the electromagnet is discontinued. During this withdrawal step, one or more electromagnets could continue to operate, thereby maintaining the minimum magnetic field required to facilitate separation.

As also indicated previously, the magnetic separator of the present invention can be used in combination with other separating means and the same will be particularly effective when used in combination with filter bags such as Nomex. When this mode of operation is used, the electromagnets will, generally, be disposed around the periphery of the bag and ferromagnetic filaments will be disposed within the bag. In those cases where the pressure drop through the bag exceeds the maximum pressure drop desired in a particular separation process, separation of the solid particulate can be facilitated by turning off one or more of the electromagnets such that the particulate drops to the bottom of the bag. Through proper design techniques, the solids which do drop could be removed so as to maintain a minimum pressure drop through the separator. Moreover, because of the enhanced separation due to the magnetic field, the bags can be made with larger openings to avoid large pressure drops.

Having thus broadly described the present invention, it is believed that the same will become even more apparent by reference to the appended drawings. Referring then to FIGS. 1 through 3, a portion of an exhaust stack comprising a magnetic separator within the scope of this invention and the magnetic separator are illustrated. As can be seen in FIG. 1, the exhaust gas flows through the stack conduit 101 in the direction generally indicated by arrows A and B and passes through the magnetic separator 102. The magnetic separator comprises a plurality of electromagnets 103—103, a plurality of magnetizable rods 104—104, which are best illustrated in FIGS. 2 and 3, and a plurality of conduit means 105—105 and 106—106 for withdrawing the solid particulate which has been separated from the gas stream. In the embodiment illustrated, the magnetic separator also comprises housing 107. As will be readily appreciated, however, a special housing is not essential to either the method or apparatus of the present invention and, indeed, the plurality of magnetizable rods could, simply be inserted into an existing exhaust stack and secured therein. The expanded housing, however, does facilitate separation and when the same is not employed it will be necessary to install other suitable withdrawal conduit.

As can best be seen in FIGS. 2 and 3 each of the magnetizable rods, as illustrated, will be cylindrical in shape and the same may range from about 0.005 to about 0.5 inches in diameter. As can also be seen from these Figures, the electromagnets are disposed within the periphery of the exhaust stack. Generally, in the embodiment illustrated, the closest magnetizable rods will be separated by a distance ranging from about 0.01 to about 2 inches. The number of electromagnets actually used is, of course, not critical to the present invention and, indeed, the actual number will depend upon the strength of the magnetic field actually required and the strength which can be produced by each of the electromagnets employed.

In operation, an electric current is passed through one or more of the electromagnets disposed around the periphery of the stacks, thereby inducing a magnetic field along the length of the magnetizable rods inside the stack. The gas stream having entrained magnetic particulate is passed, generally, upwardly in the direction illustrated by arrows A and B such that the stream passes through or around the plurality of rods. As the gas stream and the entrained solids pass around or through the magnetizable rods, the particulate will be attracted by or drawn to the rods which are in operation and will cling thereto until the flow of current to the electromagnets is discontinued. The amount of particulate actually clinging to the magnetized rods will, of course, continue to increase as the gas with entrained solid continues to pass around or through the magnetic separators. A certain amount of non-magnetic particulate material will be entrained with the magnetic materials and is collected on the rods. The separated particulate can then be withdrawn from the separator by discontinuing current through the electromagnet or electromagnets and allowing the particulate to fall into the withdrawal conduit 105—105 and/or 106—106. Though not illustrated, a flow of gas or liquid could be introduced into the withdrawal conduit to facilitate withdrawal. In general, the amount of particulate that actually deposits on the rods will not affect the strength of the magnetic field, and hence, the amount that is allowed to deposit during operation is not, generally, critical to the present invention.

In general, and as indicated previously, the number of magnetizable rods actually used during a given separation cycle is not critical so long as the same will produce a magnetic field of sufficient strength to effect the desired separation over the length of the magnetic separator. In this regard, it should be noted that the strength of the magnetic field, where a single wire is used as the collector, for a given magnetic separator, a given solid particulate and a given separation efficiency can be determined through a consideration of the weakest magnetic moment of any of the solid particulate, the gas velocity, the length of the magnetic separator and the maximum distance over which a particle might travel before the same contacts an electromagnet and particularly the strength required can be determined from the following equations:

$$E = \frac{(R_c/a)^2 - 1 + [0.955\,(\sin\phi)\,(A/a) - (\phi/30)\,(R_c/a)]\,(R_c/a)}{[0.2757\,(A/a)^2 - 1]} \quad (1)$$

wherein:
E=separation efficiency;
$R_c$=the capture radius;
a=radius of the electromagnet (wire);
$\phi$=is the angle of displacement; and
A=is the distance between adjacent electromagnets $$(R_c/a)^6 = 1 + (\angle)\,(X\,M_s^2/\mu o\eta)(R_p/a)^2(H/V) \quad (2)$$

wherein:
X=susceptibility (dimensionless);
$M_s$=magnetization;
$\mu o$=permeability;
$\eta$=fluid viscosity;
$R_p$=particle radius;
a=wire radius;
H=wire length;
$R_c$=capture radius; and
V=flow velocity.

$$H_a = H_o + dM_s \quad (3)$$

wherein
$H_a$=the applied field intensity;
$H_o$=is the actual field intensity, and
$dM_s$=is a demagnetization correction factor.

Once the minimum strength of the field required has been determined, the number of magnetizable rods or wires required to establish this field can then be easily determined from design parameters. In general, and once the actual number required has been determined, the particular combination which is used to effect the separation is not critical.

As indicated previously, the method of the present invention can be used in combination with other separating means such as a filter bag and such an embodiment is illustrated in FIG. 4. As thus illustrated, then, the main exhaust conduit will, generally, be divided into a plurality of separate streams such as 402 and 403 so as to facilitate periodic removal of the solid particulate from the filter bags 405 and 406.

In operation, the gas containing entrained magnetic particulate will flow through conduit 401 in a direction generally shown by arrow a and into either conduit 402 or 403. The gas stream will then pass through filter bag 405 or 406 and magnetic separator 407 or 408. The gas, absent the entrained solids, will then continue to flow along a path generally indicated by the arrows d or d'.

The structure of the magnetic separators 407 and 408 may, of course, be identical to that previously described with respect to FIGS. 1 and 3, with the magnetizable rods 103—103 disposed within the filter bag and need not be re-illustrated or discussed at this point. Means not illustrated will, of course, be used to periodically divert the flow from conduit 402 to 403 and then from 403 to 402 so as to facilitate periodic removal of the filter bags 405 and 406.

PREFERRED EMBODIMENTS

In a preferred embodiment of this invention, a magnetic separator will be used to separate an otherwise non-magnetic solid particulate produced as a result of the combustion of a liquid fuel which has been rendered magnetic through the addition of a soluble salt or metals-organic compound of iron, cobalt, nickel or mixtures thereof to the oil prior to combustion. As previously indicated, it is essential that the metal portion of the salt or organometallic compound have a valence of 3 when the same is iron, a valence of 3 when the same is cobalt, and a valence of 2 when the same is nickel. As also indicated previously, the anion portion of the salt or ligand is not critical. Operable salts therefore include salts of both weak and strong acids and salts of both organic and inorganic acids.

In general, the salts will be added to the oil, prior to combustion, at a concentration within the range from about 50 to about 1000 ppm (weight) and best results will be achieved when the mole ratio of metal component in the added salt or ligand to vanadium in the oil to which the same is added is within the range from about 0.25 to about 2.0. In this regard, and as indicated previously, it is believed that the metal portion of the salt, after the same has been converted to the oxide during combustion, then forms a spinel-like structure with the vanadium present in the oil as an impurity thereby yielding a solid particulate from combustion which is magnetic.

A particularly preferred embodiment of the present invention is illustrated in FIG. 5. Referring then to this Figure, a cross-section of an oil-fired boiler having a magnetic separator installed in the flue gas stream is shown. As can be seen in the Figure, oil is supplied through manifold 501. As will be readily apparent, the oil may already contain a soluble salt or suspension of $Fe^{+3}$, $Co^{+3}$, $Ni^{+2}$ or a mixture of such salts in the desired concentration or the salt could be added through line 502. When the salt is added just prior to combustion, as in the embodiment illustrated, a suitable mixing device 503 will, generally, be used. After mixing, the oil is withdrawn through line 504 and fed to burners 505—505 through feed lines 506—506. The oil is then burned with a suitable mixture of air or oxygen and a combustion effluent comprising entrained solid particulate is formed. The effluent and entrained particulate then pass through the energy recovery section 507—507 of the boiler 508 and into flue stack conduit 509. Once the combustion effluent and the entrained particulate are in the flue stack conduit 509, the same flow upwardly through magnetic separator 510, which in the embodiment illustrated, is housed within the flue gas conduit, and the combustion effluent free of entrained particulate exit through conduit 511.

In the preferred embodiment, the magnet separator will comprise an array of single strand wires, most preferably fashioned from a ferromagnetic material, and having a diameter within the range from about 0.05 to about 0.1 inches in diameter. Such a separator is illustrated more fully in FIGS. 6–9. Referring then to these Figures, and particularly FIG. 6, the electromagnetic separator 601 comprises a plurality of ferromagnetic wires 602—602 extending generally vertically or along the gas flow path and a plurality of ferromagnetic wires 603—603 extending generally horizontally or across the flow path. In general, the exact configuration of the electromagnet wire array is not critical, so long as the separation between the vertical and horizontal wires is within the range heretofore noted, and, while the configuration illustrated in FIG. 6 comprises a plurality of linear wire, other configurations could be employed. For example, and as illustrated in FIG. 7, the horizontal wires 703 could be disposed in a zigzag pattern and such a pattern could be used either with or without vertical wires. Similarly, and as illustrated in FIG. 8, horizontal wires 803—803 could be separated by linear wires such as wire 803' and used either with or without wires extending vertically. Moreover, the horizontal wires 903—903 could be disposed in a diamond pattern, as illustrated in FIG. 9. When a diamond pattern is used, however, the same will, generally, be used in combination, however, with vertical wires, such as wires 902—902, which vertical wires will be disposed at or near the center of the diamond so as to increase the strength of the magnetic field in this area.

With all of these configurations, the magnetic field will, preferably, be maintained for a distance along the gas flow path from about 10 to about 30 feet. Also, a sufficient number of electromagnetics to produce a minimum field within the separator of at least 100 gauss will be used. In the embodiment illustrated in FIGS. 6–9, the magnetic field induced in the array of ferromagnet wires is generated through the use of a magnetic field produced with remote magnets 604 and 605 in FIG. 6, 704, 705 and 706 as illustrated in FIG. 7, 804,805 and 806 as illustrated in FIG. 8 and 904, 905 and 906 as illustrated in FIG. 9. In operation a gas stream comprising solid particulate, which particulate is subject to magnetic separation, is passed through conduit 606, generally in the direction shown by arrows A and B, and hence, through magnetic separator 601. The particulate is then attracted to wires through which current is passing and the same remain there until the current is either significantly reduced or discontinued. In the embodiment illustrated, the particulate is withdrawn by first diverting the gas flow, through conduit which is not illustrated, reducing or discontinuing the current flow and then withdrawing the particulate through line 606. Valve means 607 is provided to facilitate withdrawal. Also, a carrier gas could be provided through means not illustrated, to further assist in particulate removal.

The invention will become even more apparent by reference to the following example which illustrates a particularly preferred embodiment.

EXAMPLE 1

In this Example, ferric chloride was added to a fuel oil containing about 350 ppm vanadium as an impurity in amount providing 0.25 mols $Fe^{+3}$ per mol of vanadium. The fuel oil was then burned, the solid particulate recovered and separated into three fractions; viz., a fraction comprising particulate having a size greater than about 10 microns, a fraction having a size from about 1 to about 10 microns and a fraction comprising that particulate having a particle size less than about 1 micron. The magnetic moment of the two smaller fractions was then determined using a vibrating sample magnotometer and the values obtained are shown below:

| Fraction Size, Microns | Magnetic Moment, $EMU/cm^3$ |
|---|---|
| 1–10 | $1.7 \times 10^{-3}$ |
| <1 | $9.9 \times 10^{-4}$ |

Each of the particulate fractions obtained as a result of the combustion of a fuel oil containing vanadium as an impurity and having ferric chloride added thereto were also subjected to a magnetic field, from a permanent magnet, and it was found that at least 98% of all of the particulate could be attracted to a magnet. Analytical analysis of each of the fractions also indicated that that fraction having particle sizes greater than 10 microns was at least 75 wt. % carbon and x-ray analysis implicated the presence of both a ferric vanadium spinel and a ferric nickel spinel.

For purposes of comparison a sample of the same oil was combusted, without the addition of any ferric chloride, and the particulate divided into the same fractions. The magnetic moment of the two smaller fractions, was again determined with the following results:

| Fraction Size, Microns | Magnetic Moment, EMU/cm$^3$ |
|---|---|
| 1-10 | $3.4 \times 10^{-5}$ |
| $<1$ | $9.5 \times 10^{-5}$ |

This example, then, clearly illustrates that the solid particulate normally produced as the result of the combustion of a fuel oil can be rendered magnetic through the addition of a ferric salt; viz., ferric chloride and that the particulate can then be attracted to a magnet, and hence, separated thereby.

Figure 10:
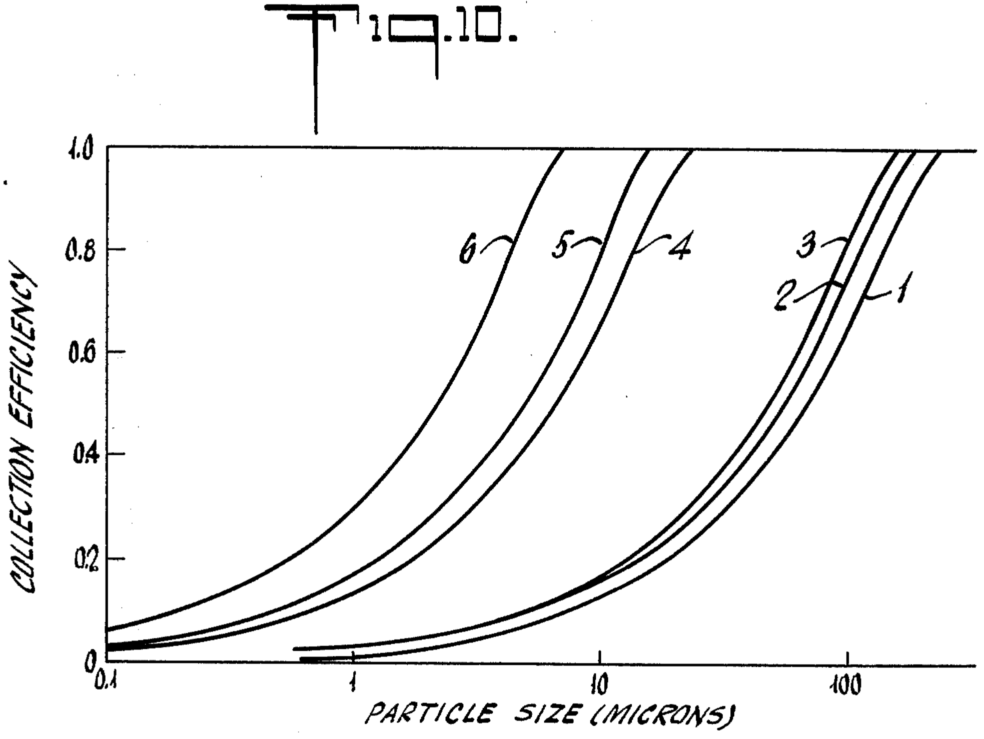
FIG. 10 is a plot showing collection or separation efficiency for varying particulate and/or magnetic field strength.

To further illustrate the effectiveness of the present invention, a series of calculations were used to determine the relative collection or separation efficiency of a magnetic separator within the scope of this invention and having a plurality of rods extending generally parallel with respect to gas flow and for different particle sizes and magnetic field strength. The results of these calculations, which are based on a gas velocity of 5 fps and a rod length of 10 feet, are shown in FIG. 10 wherein: curve 1 is for a field strength of 1,948 gauss rod separation of 0.5 inches and a particle susceptibility of 0.0148 MKS units; curve 2 is for a field strength of 19,480 gauss, a rod separation of 1.0 inches and a particle susceptibility of 0.0148 MKS units; curve 3 is for a field strength of 19,480 gauss, a rod separation of 0.5 inches and a particle susceptibility of 0.00296 MKS units; curve 4 is for a field strength of 19,480 gauss, a rod separation of 0.5 inches and a particle susceptibility of 0.0148 MKS units; curve 5 is for a field strength of 19,480 gauss, a rod separation of 0.5 inches and a particle susceptibility of 0.0296 MKS units and curve 6 is for a field strength of 19,480 gauss, a rod separation of 0.5 inches and a particle susceptibility of 0.148 MKS units.

What is claimed is:

1. A process for preventing the emission of solid particulates to the atmosphere from the effluent gas stream produced during the combustion of a carbonaceous fuel comprising the steps of:

(a) combusting a solid particulate containing carbonaceous fuel under oxidative conditions with a suitable mixture of air or oxygen, wherein said carbonaceous fuel additionally contains a soluble salt or suspension of a metal selected from the group consisting of $Fe^{+3}$, $Co^{+3}$, $Ni^{+2}$ or a mixture thereof which is converted to a magnetic oxide during combustion to the fuel; and (b) passing the oxidized combustion effluent containing entrained solid particulates and magnetic oxides through at least one magnetic separator having an imposed magnetic field to thereby separate the particulate solids from the gas stream containing the combustion effluent.

2. The process of claim 1 wherein the gas velocity of said combustion effluent is within the range from about 0.5 to about 5.0 m/sec.

3. The process of claim 1 wherein the imposed magnetic field is within the range from about 100 to about 10,000 gauss.

4. The process of claim 1 wherein the soluble salt or suspension of a ferromagnetic metal is present in said carbonaceous fuel in an amount ranging from about 50 to about 1000 ppm (weight) of the fuel.

5. The process of claim 1 wherein the magnetic separator comprises an array of ferromagnetic single strand wires.

6. The process of claim 1 wherein the electromagnetic separator comprises a plurality of ferromagnetic wires extending generally vertically or along the gas flow path.

7. The process of claim 1 wherein the electromagnetic separator comprises a plurality of ferromagnetic wires extending generally horizontally or across the gas flow path.

8. The process of claim 1 wherein the electromagnetic separator comprises a plurality of ferromagnetic wires disposed in a zigzag pattern horizontal across the gas flow path.

9. The process of claim 1 wherein the magnetic oxides of said soluble salt or suspension of the metal present in the combusted carbonaceous fuel which is oxidized has a magnetic moment greater than about $1\times10^{-2}$ emu/cm$^3$.

10. The process of claim 1 wherein the solid particulates attracted toward the magnetic field in the magnetic separator are withdrawn from the gas stream when the imposed magnetic field around the magnetic separator is discontinued.

11. A process for preventing the emission of solid particulates to the atmosphere from the effluent gas stream produced during the combustion of a carbonaceous fuel comprising the steps of:

(a) adding a soluble salt or suspension of a metal selected from the group consisting of $Fe^{+3}$, $Co^{+3}$, $Ni^{+2}$ or a mixture thereof to a carbonaceous fuel containing solid particulates;

(b) combusting said solid particulate containing carbonaceous fuel which additionally contains said soluble salt or suspension of a metal under oxidative conditions whereby said metal is converted to magnetic oxides; and (c) passing the oxidized combustion effluent containing entrained solid particulates and magnetic oxides through at least one magnetic separator having an imposed magnetic field to thereby separate the particulate solids from the gas stream containing the combustion effluent.

12. The process of claim 11 wherein entrained solid particulates ranging in size from about 100 microns to about 0.01 microns in the combustion effluent are removed when the gas velocity of said combustion is within the range from about 0.5 to about 5.0 m/sec and the imposed magnetic field is within the range from about 100 to about 10,000 gauss.

13. The process of claim 11, wherein the soluble salt or suspension of the metal is present in said carbonaceous fuel in an amount ranging from about 50 to about 1000 ppm (weight) of the fuel.

14. The process of claim 11 wherein the magnetic separator comprises an array of ferromagnetic single strand wires.

15. The process of claim 11 wherein the magnetic oxides of said soluble salt or suspension of the metal present in said combusted carbonaceous fuel has a magnetic moment greater than about $1\times10^{-2}$ emu/cm$^3$.

16. The process of claim 11 wherein the solid particulates attracted toward the magnetic field in the magnetic separator are withdrawn from the gas stream when the imposed magnetic field around the magnetic separator is discontinued.

* * * * *